United States Patent
Reuter et al.

(10) Patent No.: US 11,674,444 B2
(45) Date of Patent: Jun. 13, 2023

(54) FLOW DIVIDER VALVES WITH TRANSIENT PRESSURE LIMITING

(71) Applicant: Hamilton Sundstrand Corporation, Charlotte, NC (US)

(72) Inventors: Charles E. Reuter, Granby, CT (US); Aaron F. Rickis, Long Meadow, MA (US); Francis P. Marocchini, Somers, CT (US); Matej Rutar, Manchester, CT (US); August M. Coretto, Manchester, CT (US); Sachin Ramprashad, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 43 days.

(21) Appl. No.: 17/217,659

(22) Filed: Mar. 30, 2021

(65) Prior Publication Data

US 2021/0301724 A1   Sep. 30, 2021

Related U.S. Application Data

(60) Provisional application No. 63/002,266, filed on Mar. 30, 2020.

(51) Int. Cl.
F02C 7/232    (2006.01)
F02C 7/22     (2006.01)

(52) U.S. Cl.
CPC .............. *F02C 7/232* (2013.01); *F02C 7/222* (2013.01); *F05D 2220/32* (2013.01)

(58) Field of Classification Search
CPC .......... F02C 7/232; F02C 7/222; F02C 7/228; F02C 9/34
See application file for complete search history.

(56) References Cited

U.S. PATENT DOCUMENTS 5,339,636 A * 8/1994 Donnelly ............... F02C 7/228
                                                   60/734
5,448,882 A * 9/1995 Dyer ...................... F02C 9/263
                                                   60/39.281

(Continued)

FOREIGN PATENT DOCUMENTS

EP   2535644 A2   12/2012

OTHER PUBLICATIONS

Extended European Search Report dated Aug. 6, 2021, issued during the prosecution of European Patent Application No. EP 21164538.7, 5 pages.

*Primary Examiner* — Ehud Gartenberg
*Assistant Examiner* — Jacek Lisowski
(74) *Attorney, Agent, or Firm* — Locke Lord LLP; Scott D. Wofsy; Alicia J. Carroll

(57) ABSTRACT

A system includes a flow inlet conduit and a primary conduit that branches from the flow inlet conduit for delivering flow to a set of primary nozzles. An equalization bypass valve (EBV) connects between the flow inlet conduit and a secondary conduit for delivering flow to a set of secondary nozzles. The EBV is connected to an equalization conduit (EC). A pressure equalization solenoid is connected to the EC to selectively connect a servo supply pressure conduit and/or a return pressure (PDF) conduit into fluid communication with the EC. An EBV rate limiting orifice (RLO) is connected in the PDF conduit. A bypass conduit branches from the PDF conduit on a first side of the EBV RLO and reconnects to the PDF conduit on a second side of the EBV RLO. An orifice bypass valve (OBV) is connected to the bypass conduit and acts to selectively bypass the EBV RLO.

13 Claims, 3 Drawing Sheets

(56) References Cited

U.S. PATENT DOCUMENTS

| | | |
|---|---|---|
| 6,334,296 B2 | 1/2002 | Futa, Jr. et al. |
| 8,316,630 B2 | 11/2012 | Futa et al. |
| 9,234,465 B2 * | 1/2016 | Futa .................. F02C 9/34 |
| 2005/0217235 A1 * | 10/2005 | Zielinski ............. F02C 7/232 |
| | | 60/39.281 |
| 2005/0217236 A1 * | 10/2005 | Wernberg ............. F02C 9/30 |
| | | 60/39.281 |
| 2005/0279079 A1 * | 12/2005 | Baryshnikov ......... F02C 7/232 |
| | | 60/39.094 |
| 2007/0245744 A1 | 10/2007 | Dooley |
| 2008/0256954 A1 * | 10/2008 | Dooley ............... F23R 3/343 |
| | | 60/733 |
| 2008/0271456 A1 * | 11/2008 | Scully ................ F02C 9/263 |
| | | 60/740 |
| 2009/0320480 A1 * | 12/2009 | Scully ................ F02C 7/228 |
| | | 137/98 |
| 2010/0050593 A1 * | 3/2010 | Futa .................. F02C 7/232 |
| | | 60/790 |
| 2010/0242431 A1 * | 9/2010 | Baker ................. F02C 7/232 |
| | | 417/278 |
| 2018/0372321 A1 | 12/2018 | Yates et al. |

\* cited by examiner ary nozzles. Valves are used to control the flow split between the primary and secondary nozzles. There are transitions from one flow split to another that need to be rate controlled to prevent disturbances, especially at low flow conditions. The better the time response when switching from one flow split to another without disturbances, the better the system can perform.

FLOW DIVIDER VALVES WITH TRANSIENT PRESSURE LIMITING

CROSS-REFERENCE TO RELATED APPLICATIONS

This application claims priority to and the benefit of U.S. Provisional Application No. 63/002,266, filed Mar. 30, 2020, the entire contents of which are herein incorporated by reference in their entirety.

BACKGROUND

1. Field

The present disclosure relates to flow splitting systems, and more particularly to flow divider valves such as for use in aerospace fuel systems.

2. Description of Related Art

Gas turbine burners can have at least two sets of fuel injection nozzles, e.g., primary nozzles and secondary nozzles. Valves are used to control the flow split between the primary and secondary nozzles. There are transitions from one flow split to another that need to be rate controlled to prevent disturbances, especially at low flow conditions. The better the time response when switching from one flow split to another without disturbances, the better the system can perform.

The conventional techniques have been considered satisfactory for their intended purpose. However, there is an ever present need for improved systems and methods for flow divider valves. This disclosure provides a solution for this need.

SUMMARY

A system includes a flow inlet conduit and a primary conduit that branches from the flow inlet conduit for delivering flow to a set of primary nozzles. An equalization bypass valve (EBV) connects between the flow inlet conduit and a secondary conduit for delivering flow to a set of secondary nozzles. The EBV is connected to an equalization conduit (EC) to apportion flow from the flow inlet conduit to the secondary conduit. A pressure equalization solenoid (PES) is connected to the EC to selectively connect a servo supply pressure (PFA) conduit and/or a return pressure (PDF) conduit into fluid communication with the EC. An EBV rate limiting orifice (RLO) is connected in the PDF conduit. A bypass conduit branches from the PDF conduit on a first side of the EBV RLO and reconnects to the PDF conduit on a second side of the EBV RLO. An orifice bypass valve (OBV) is connected to the bypass conduit. The OBV acts to selectively bypass the EBV RLO.

In some embodiments, the orifice bypass valve includes a valve body that occludes the bypass conduit in a closed position and permits flow through the bypass conduit in a open position. The EBV can include a piston that divides flow between the EC and the flow inlet conduit to apportion flow from the flow inlet conduit to the secondary conduit based on a pressure differential between a flow meter pressure at the flow inlet conduit and a pressure in the EC.

The PES can include a valve body positioned to selectively connect at least one of the PFA conduit or the PDF conduit to switch the primary conduit and the secondary conduit between an equalized mode, where the primary and secondary conduits are at equal pressure, and an un-equalized mode, where the primary and secondary conduits are at unequal pressure. The pressure in the EC can be at least one of a servo supply pressure (PFA) or a return pressure (PDF).

An un-equalized enrichment valve (UEV) can connect between the flow inlet conduit and the secondary conduit. The UEV can be configured to pressurize the primary conduit higher than the secondary conduit in an un-equalized mode. The OBV can be configured to open more flow into the PDF conduit as pressure rises during the transition to the equalized mode. An EBV rate limiting high-pressure orifice can be connected in the PFA conduit. The EBV RLO can be an EBV rate limiting low-pressure orifice.

In accordance with another aspect, a method includes increasing flow through the OBV after a command for switching the system from an un-equalized mode to an equalized mode at a high acceleration pressure rise. In some embodiments, at a low pressure scenario in the flow inlet conduit, the flow through the OBV does not increase. In some embodiments, at a high acceleration pressure rise the flow through the OBV increases. The high acceleration can be relative to the low pressure scenario. The method can include preventing system over pressurization during the high pressure acceleration pressure rise when the EBV is too slow.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
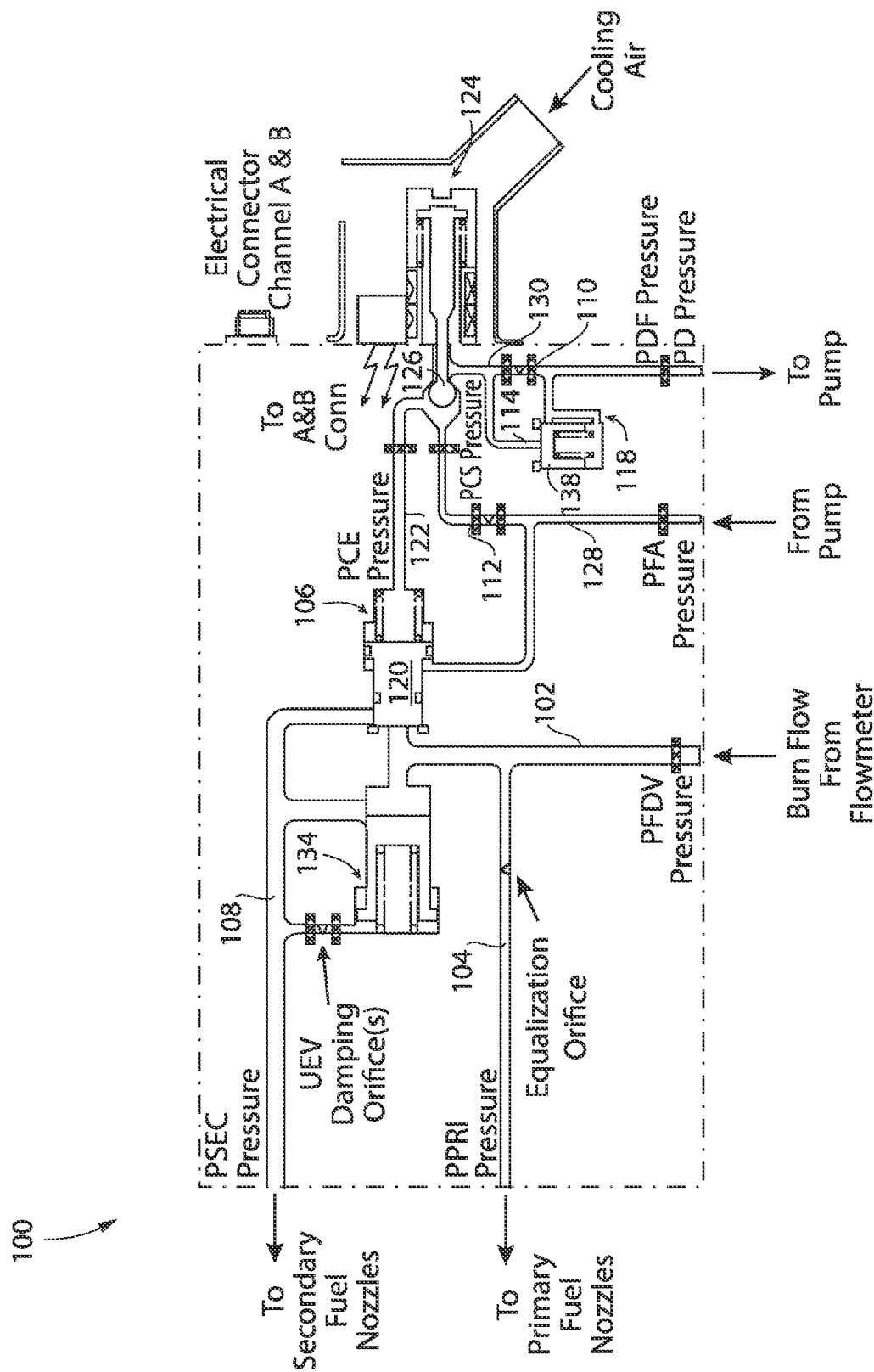
FIG. 1 is a schematic view of an embodiment of a system constructed in accordance with the present disclosure, showing the inlet flow conduit, primary conduit, secondary conduit, and the valves, all in un-equalized mode.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to provide for variable rate limiting when transitioning between equalized and un-equalized modes without causing large fuel flow disturbances relative to traditional flow division systems that divide flow between a primary set of fuel nozzles and a secondary set of fuel nozzles. For rapid transients, rate limiting is bypassed by an orifice bypass valve to assure that upstream pressures stay below relief pressure (or generally do not get too high). This can allow for much faster flow split transitions relative to traditional systems, and/or reduce the resulting fuel flow disturbances. Embodiments of the disclosure as described herein can be retrofitted into many existing flow division systems.

As shown in FIG. 1, a system 100 includes a flow inlet conduit 102. A primary conduit 104 branches from the flow inlet conduit 102 for delivering flow to a set of primary nozzles. An equalization bypass valve (EBV) 106 connects between the flow inlet conduit 102 and a secondary conduit 108 for delivering flow to a set of secondary nozzles. The EBV is connected to an equalization conduit (EC) 122 to be controlled by an EBV control pressure to apportion flow from the flow inlet conduit 102 to the secondary conduit 108. The EBV 106 includes a piston 120 that divides between EC 122 and the flow inlet conduit 102 to allow or restrict flow from the flow inlet conduit 102 to the secondary conduit 108 based on pressure differential between a flow meter pressure (PFDV) at the flow inlet conduit 102 and the servo pump supply pressure (PFA), and a pressure (PCE) in the EC 122. The PCE is switched between the PFA pressure (which closes valve since PFA>PFDV) and a return pressure (PDF) which is lower than the sum of PFDV and PFA (which opens the valve).

With continued reference to FIG. 1, the system 100 includes a pressure equalization solenoid (PES) 124 connected to the EC 122 to switch the system 100 between an un-equalized and an equalized mode. The PES 124 includes a valve body 126 positioned to selectively connect servo supply pressure (PFA) conduit 128 or a return pressure (PDF) conduit 130 into fluid communication with the EC 122 to switch the primary and secondary conduits 104, 108 between an equalized mode (FIG. 3), where the primary and secondary conduits 104, 108 are at equal pressure, and an un-equalized mode (FIG. 1), where the primary and secondary conduits 104, 108 are at unequal pressure.

Figure 2:
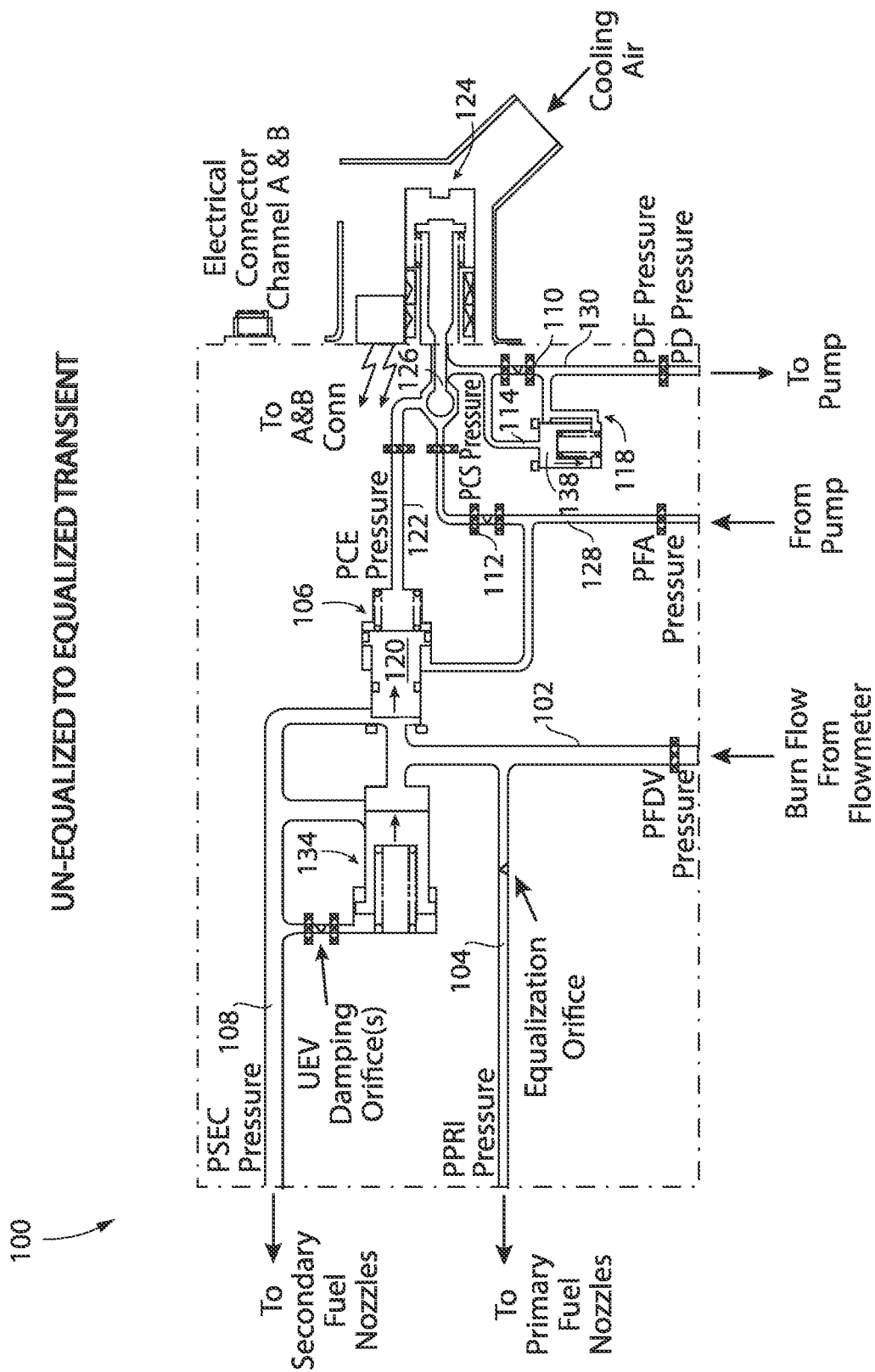
FIG. 2 is a schematic view of an embodiment of the system of FIG. 1, showing the transition between un-equalized mode and equalized mode.
Figure 3:
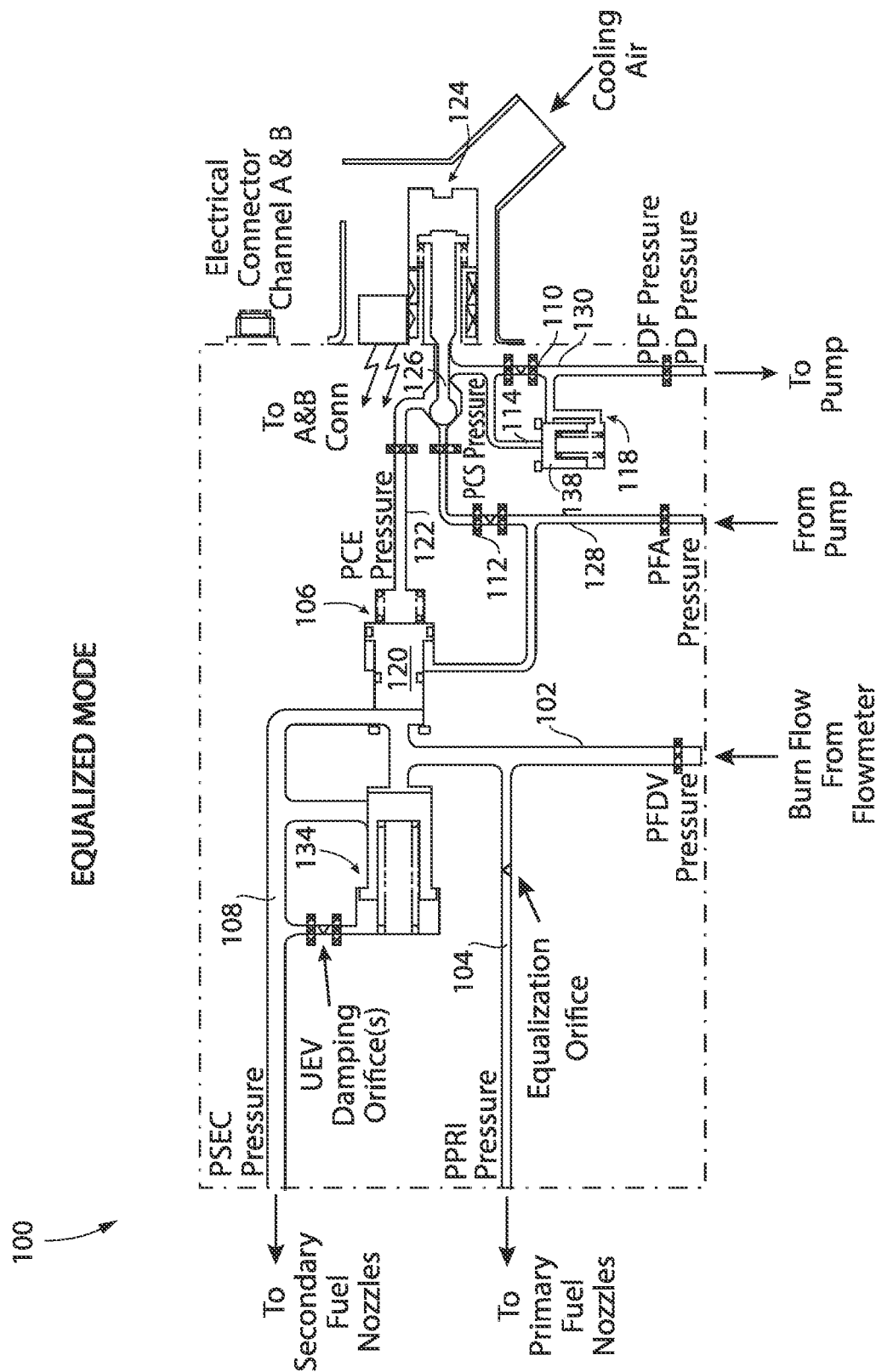
FIG. 3 is a schematic view of an embodiment of the system of FIG. 1, showing the equalized mode.

As shown in FIG. 2, movement of the valve body 126 to the left of the position shown in FIG. 3 places EC 122 and PDF conduit 130 in fluid communication with one another, actuating piston 120 to the right. The pressure in the EC is at least one of a servo supply pressure (PFA) or a return pressure (PDF). An un-equalized enrichment valve (UEV) 134 connects between the flow inlet conduit 102 and the secondary conduit 108. The UEV 134 is configured to pressurize the primary conduit 104 higher than the secondary conduit 108 in the un-equalized mode resulting in enriched flow to the primary nozzles, e.g. for starting and burner tonal control. In equalized mode, the pressure delivered to primary and secondary nozzles is the same and the flow split between the nozzles is a function of only the nozzle area ratio. In equalized mode, the EBV has moved to the right, opening a large flow path between 102 and 108. So flow no longer has to go through the UEV.

As shown in FIGS. 1-3, the system includes an EBV low-pressure (LP) rate limiting orifice (RLO) 110 connected in the PDF conduit 130. The system includes an EBV high-pressure (HP) rate limiting orifice (RLO) 112 connected in the PFA conduit 128. Transitioning between equalized and un-equalized modes is rate limited with the EBV LP and HP RLOs 110 and 112, respectively, to minimize unacceptable flow disturbance during transition, particularly at low burn flows. The system includes a bypass conduit 114 branching from the PDF conduit 130 on a first side the EBV LP RLO 110 and reconnecting to the PDF conduit on a second side of the EBV LP RLO 110.

With continued reference to FIGS. 1-3, the system includes an orifice bypass valve (OBV) 118 connected to the bypass conduit 114. During a rapid acceleration from idle to high power in unequalized operation, the EBV rate limiting LP orifice 110 limits how quickly the EBV 106 can open. If the EBV 106 opens too slowly during the transient, too much flow is forced through the more restrictive primary circuit, resulting in excessive high pressure in upstream components. OBV 118 positioned in parallel with the EBV rate limiting LP orifice 110 permits the EBV to open more quickly during a rapid acceleration transient and avoids high pressure transients. The OBV 118 remains closed for lower power transients assuring that EBV 106 swept flow is restricted and rate limiting of the EBV is sufficient to prevent perturbation of upstream components from fast pressure changes. The OBV 118 includes a valve body 138 that is configured to open more flow into the PDF conduit 130 as pressure rises in the transient to the equalized mode as the valve body 126 moves to the left and EBV slews to the right. The valve body 138 occludes the bypass conduit 114 in a closed position and permits flow through the bypass conduit in an open position. The OBV 118 is triggered if the pressure differential between a control pressure (PCS) at the PES 124 and PDF is greater than OBV 118 opening pressure.

A method includes increasing flow through the OBV, e.g. the OBV 118, after a command for switching the system, e.g. system 100, from an un-equalized mode to an equalized mode. At a low pressure scenario in the flow inlet conduit, e.g. flow inlet conduit 102, the flow through the OBV does not increase. At a high acceleration pressure rise the flow through the OBV increases. The acceleration is relative to the low pressure scenario. The method includes preventing system over pressurization during the high pressure acceleration pressure rise when the EBV is too slow to handle the fast acceleration without disturbances e.g. at downstream nozzles. At low power pressure transitions OBV does not open. At high power pressure transitions it does, making the embodiments of the present invention advantageous for scenarios of fast accelerations.

The methods and systems of the present disclosure, as described above and shown in the drawings, provide for variable rate-controlled split transitions to minimize the disturbances relative to traditional flow division systems that divide flow between a primary set of fuel nozzles and a secondary set of fuel nozzles. For rapid transients, the OBV permits bypassing the rate limiting to prevent upstream transient over pressurization issues. This can allow for much faster flow split transitions relative to traditional systems, and/or reduce the resulting fuel flow disturbances. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
    a flow inlet conduit;
    a primary conduit branching from the flow inlet conduit for delivering flow to a set of primary nozzles;
    an equalization bypass valve (EBV) that connects between the flow inlet conduit and a secondary conduit for delivering flow to a set of secondary nozzles, wherein the EBV is connected to an equalization conduit (EC) to apportion flow from the flow inlet conduit to the secondary conduit, wherein the primary conduit branches from the flow inlet conduit upstream from the EBV;
    a pressure equalization solenoid (PES) connected to the EC to selectively connect at least one of a servo supply pressure (PFA) conduit or a return pressure (PDF) conduit into fluid communication with the EC;

an EBV rate limiting orifice (RLO) connected in the PDF conduit;

a bypass conduit branching from the PDF conduit on a first side of the EBV rate limiting orifice and reconnecting to the PDF conduit on a second side of the EBV rate limiting orifice; and an orifice bypass valve (OBV) connected to the bypass conduit, wherein the OBV acts to selectively bypass the EBV RLO.

2. The system as recited in claim 1, wherein the orifice bypass valve includes a valve body that occludes the bypass conduit in a closed position and permits flow through the bypass conduit in an open position.

3. The system as recited in claim 1, wherein the EBV includes a piston that divides flow between the EC and the flow inlet conduit to apportion flow from the flow inlet conduit to the secondary conduit based on a pressure differential between a flow meter pressure at the flow inlet conduit and a pressure in the EC.

4. The system as recited in claim 3, wherein the PES includes a valve body positioned to selectively connect at least one of the PFA conduit or the PDF conduit to switch the primary conduit and the secondary conduit between an equalized mode, where the primary and secondary conduits are at equal pressure, and an un-equalized mode, where the primary and secondary conduits are at unequal pressure.

5. The system as recited in claim 3, wherein the pressure in the EC is at least one of a PFA or PDF.

6. The system as recited in claim 1, further comprising an un-equalized enrichment valve (UEV) that connects between the flow inlet conduit and the secondary conduit.

7. The system as recited in claim 6, wherein the UEV is configured to pressurize the primary conduit higher than the secondary conduit in an un-equalized mode.

8. The system as recited in claim 1, wherein the OBV is configured to open more flow into the PDF conduit as pressure rises during the transition to an equalized mode.

9. The system as recited in claim 1, further comprising an EBV rate limiting high-pressure orifice connected in the PFA conduit.

10. The system as recited in claim 1, wherein the EBV RLO is an EBV rate limiting low-pressure orifice.

11. A method comprising:
in a system as recited in claim 1, increasing flow through the OBV after a command for switching the system from an un-equalized mode to an equalized mode.

12. The method as recited in claim 11, wherein at a low pressure scenario in the flow inlet conduit, the flow through the OBV does not increase.

13. The method as recited in claim 11, further comprising preventing system over pressurization by opening more flow into the PDF conduit if a difference between a control pressure (PCS) at the PES and a return pressure (PDF) is greater than an OBV opening pressure.

* * * * *